United States Patent [19]

Russ et al.

[11] Patent Number: 5,404,382
[45] Date of Patent: Apr. 4, 1995

[54] METHOD OF EXCHANGING A NOZZLE PASSING THROUGH A COVER OF A NUCLEAR REACTOR PRESSURE VESSEL

[75] Inventors: Jakob Russ, Römerberg; Günter Bäro, Weinheim; Franz Pötz, Heppenheim, all of Germany

[73] Assignee: ABB Reaktor GmbH, Mannheim, Germany

[21] Appl. No.: 142,213

[22] Filed: Oct. 25, 1993

[30] Foreign Application Priority Data

Oct. 24, 1992 [DE] Germany .............. 42 36 005.6

[51] Int. Cl.⁶ .................................. G21C 13/00
[52] U.S. Cl. ...................... 376/260; 29/402.08; 29/446
[58] Field of Search ............ 376/204, 260, 296, 307, 376/463, 294; 29/402.08, 890.031, 446, 452; 228/119

[56] References Cited

U.S. PATENT DOCUMENTS

| | | | |
|---|---|---|---|
| 3,240,514 | 3/1966 | Bell | 376/204 |
| 3,834,740 | 9/1974 | Bazant et al. | 376/203 |
| 3,907,636 | 9/1975 | Swart | 376/463 |
| 4,782,727 | 11/1988 | Martin et al. | 376/260 |
| 5,094,801 | 3/1992 | Dixon et al. | 376/307 |
| 5,278,878 | 1/1994 | Porowski | 376/260 |

FOREIGN PATENT DOCUMENTS

| | | |
|---|---|---|
| 0031669 | 7/1981 | European Pat. Off. . |
| 0158544 | 10/1985 | European Pat. Off. . |
| 0288745 | 11/1988 | European Pat. Off. . |
| 0440353 | 8/1991 | European Pat. Off. . |
| 2069737 | 9/1971 | France . |
| WO92/00591 | 1/1992 | WIPO . |

OTHER PUBLICATIONS

"Atomwirtschaft" (Atomic Industry), May 1975 pp. 254–255.

*Primary Examiner*—Daniel D. Wasil
*Attorney, Agent, or Firm*—Herbert L. Lerner; Laurence A. Greenberg

[57] ABSTRACT

After some time incipient cracks may occur in nozzles welded directly into a reactor pressure vessel cover for guiding a control rod, which make it necessary to exchange the nozzles. A method is provided for exchanging the nozzles which changes the structure of the cover little during removal and accomplishes low-stress installation. According to the method, the nozzles are installed with prestressing. An annular surface is introduced from the inside of the cover coaxially to the through-bore and a supporting surface is introduced from the outside of the cover, which surfaces serve for applying the prestressing force and arresting the same.

18 Claims, 8 Drawing Sheets

Fig. 3
Fig. 3a
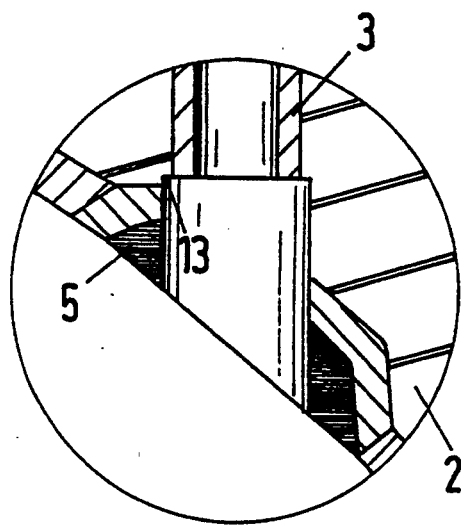
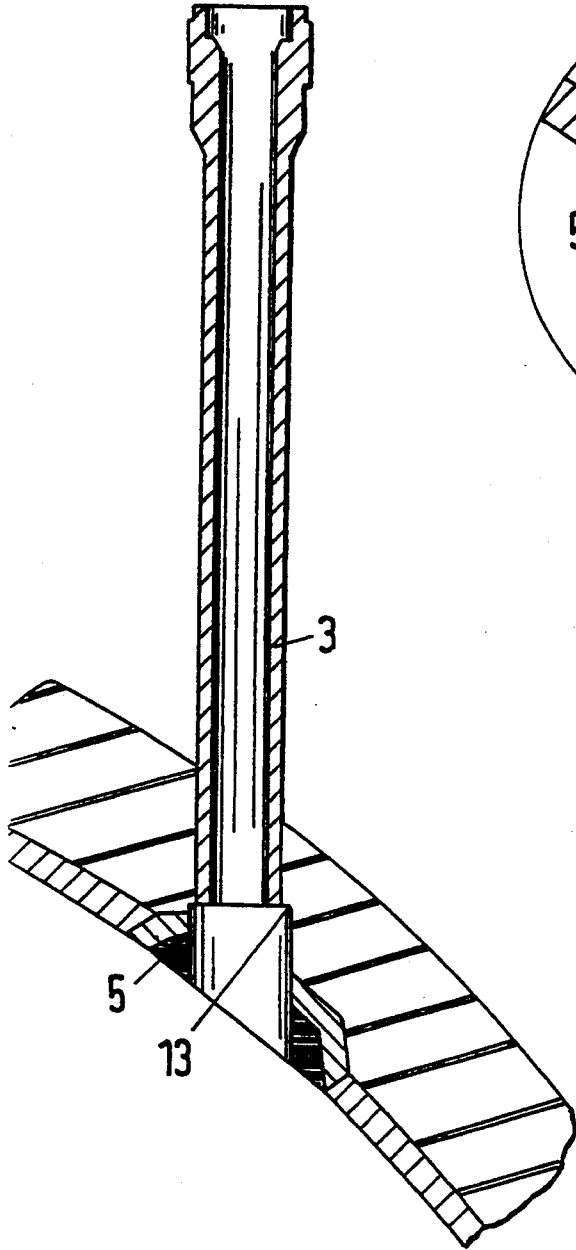

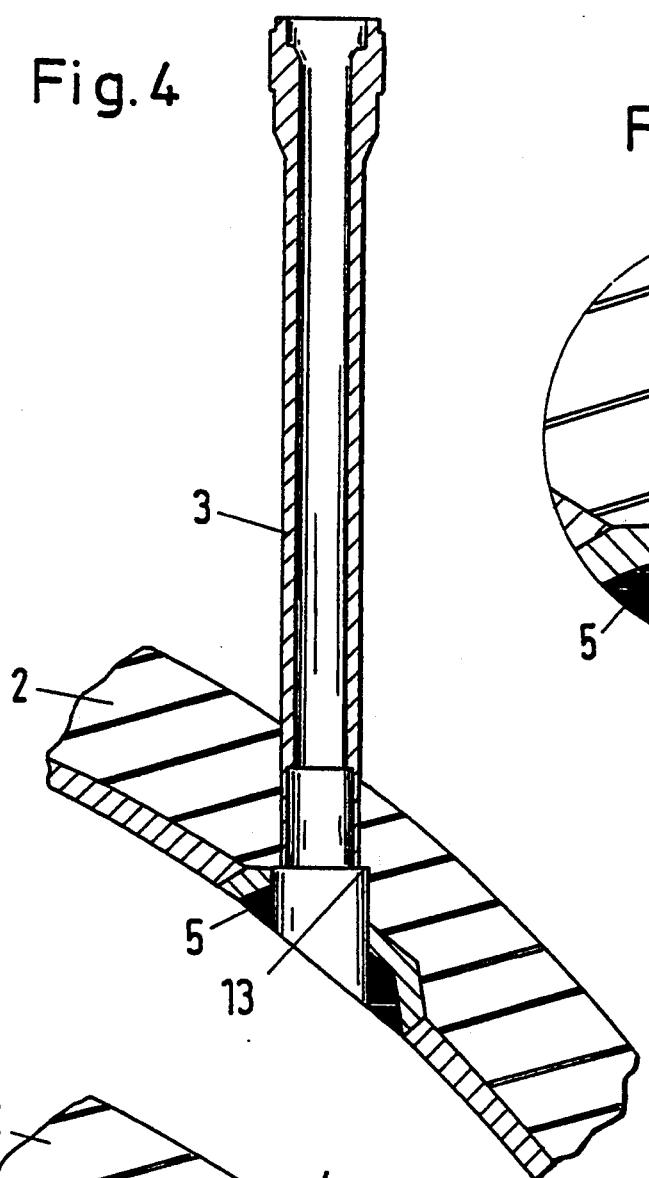
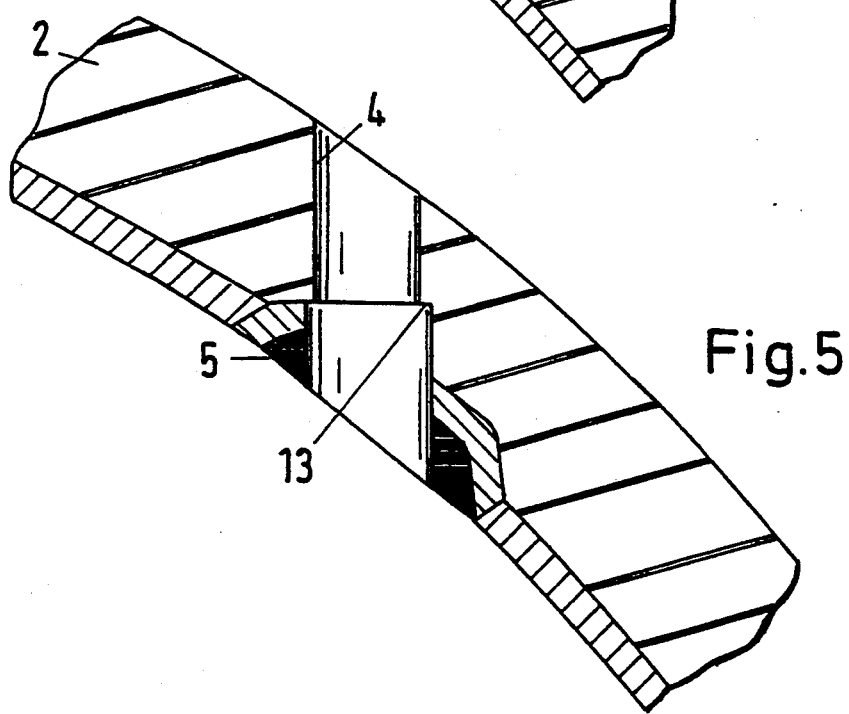

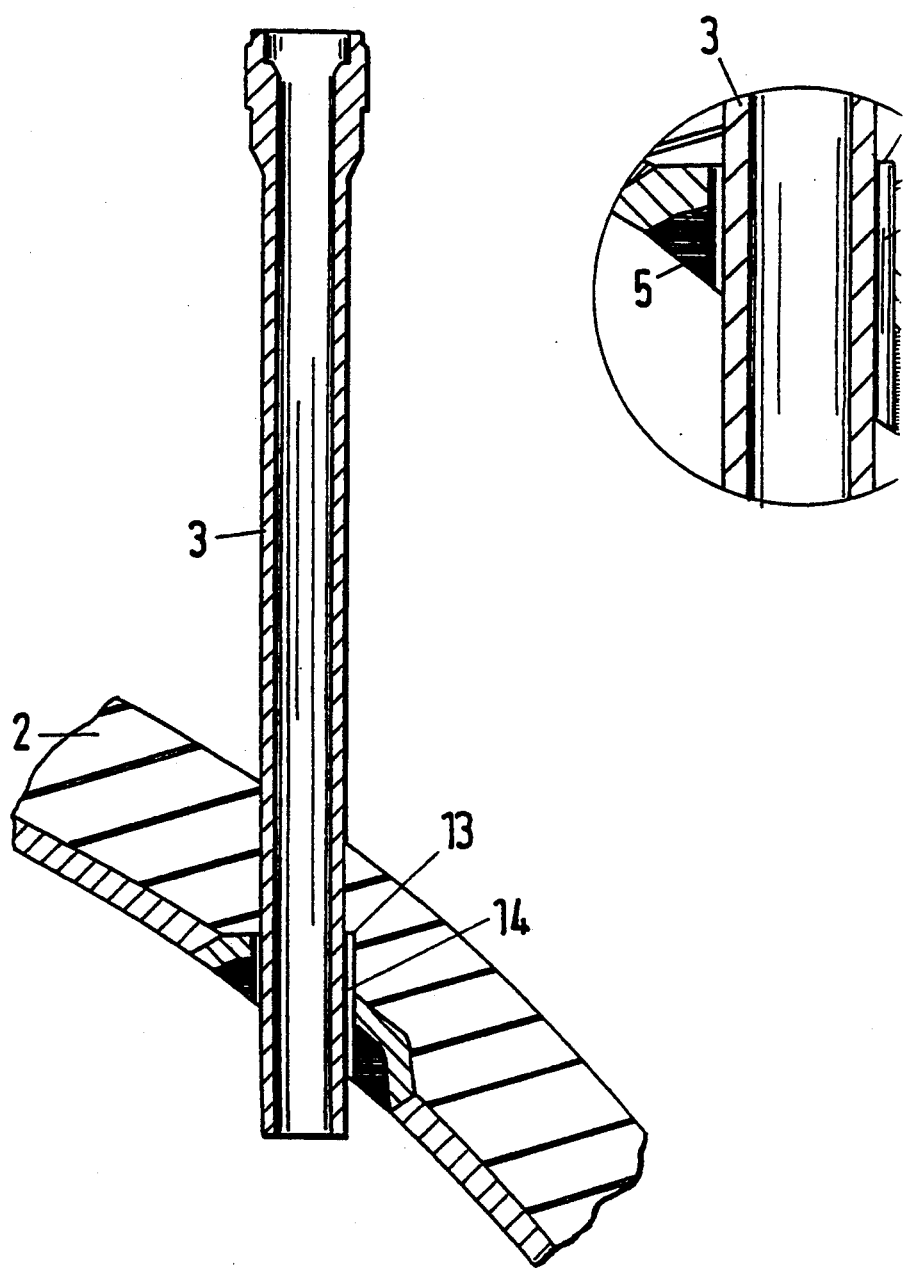

Fig. 7
Fig. 7a
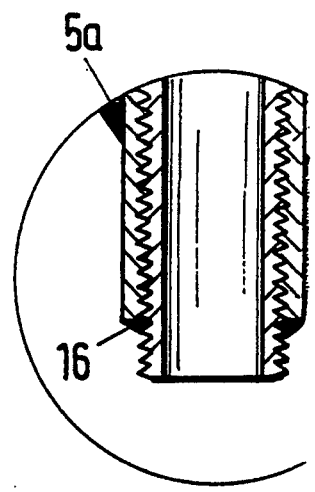
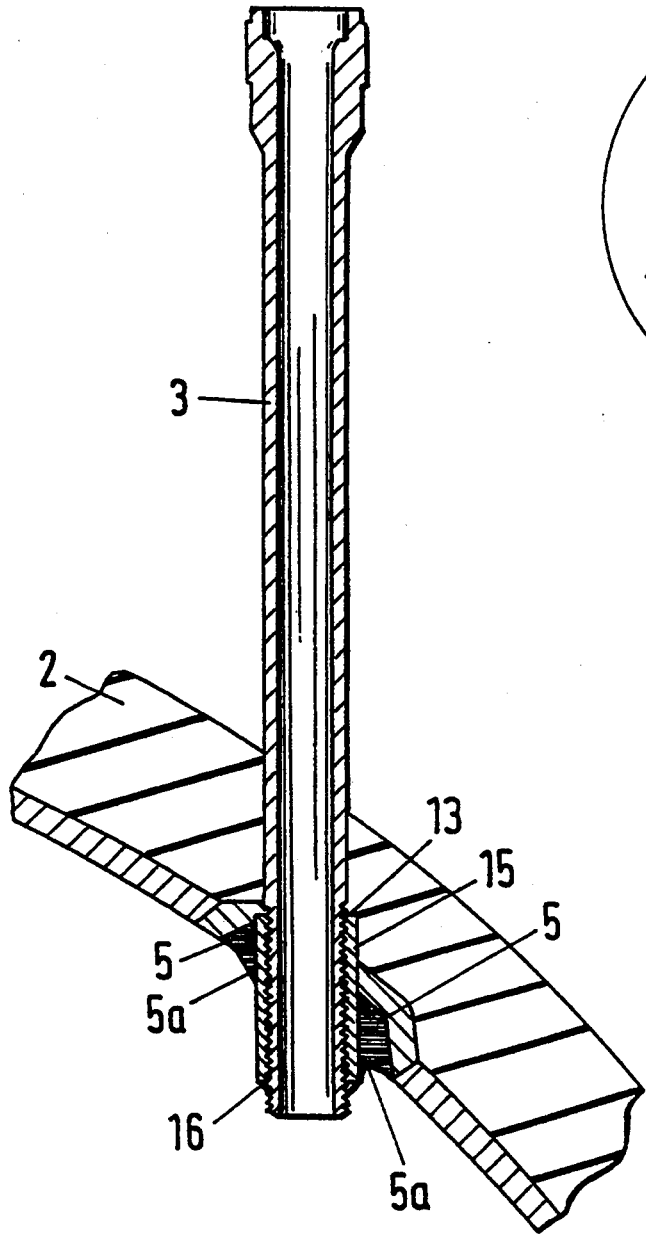

METHOD OF EXCHANGING A NOZZLE PASSING THROUGH A COVER OF A NUCLEAR REACTOR PRESSURE VESSEL

BACKGROUND OF THE INVENTION

FIELD OF THE INVENTION

The invention relates to a method of exchanging a nozzle passing through a cover of a nuclear reactor pressure vessel for guiding a control rod, which nozzle is fixed relative to the cover in a through-bore by a welded joint.

Such a nozzle penetration assembly is known from the journal entitled "Atomwirtschaft"[Atomic Industry], May 1975, pages 254/255.

In that article, a weld seam represents a load-bearing connecting link between the nozzle and the cover. Apart from the internal pressure, the welded joint must also be able to absorb lateral forces, on which, for example, an earthquake construction is based. An asymmetrical path of the weld seam, which is dictated by a penetration curve between the nozzle and the inside of the cover, results in disadvantageous stress loads on the nozzle, in particular underneath the welded joint. Since the inside of the nozzle has stresses caused by the weld seam, a medium contacting the inside, such as, for example, the coolant of a pressurized water reactor, promotes the occurrence of stress crack corrosion.

Therefore, after lengthy operation of a nuclear reactor plant, the occurrence of small incipient cracks at the nozzle, in particular in the region of the weld seam, cannot be ruled out.

SUMMARY OF THE INVENTION

It is accordingly an object of the invention to provide a method of exchanging a nozzle passing through a cover of a nuclear reactor pressure vessel, which overcomes the hereinafore-mentioned disadvantages of the heretofore-known methods of this general type, which does not greatly affect the structure of the cover when the nozzle is removed and which accomplishes installation of the nozzle with little stress.

With the foregoing and other objects in view there is provided, in accordance with the invention, a method of exchanging a nozzle passing through a cover of a nuclear reactor pressure vessel for guiding a control rod, which comprises removing the nozzle being welded in a through-bore formed in the cover with the nozzle being fixed relative to the cover, by boring or drilling out and subsequently pulling out the nozzle; inserting a new nozzle into the through-bore; introducing a sleeve over the new nozzle until the sleeve comes to bear against the inside of the cover; producing a weld seam between the sleeve and the cover; and producing a weld seam between the sleeve and the new nozzle.

The weld seams between the sleeve and the cover and between the nozzle and the sleeve, which are necessary after pushing on the sleeve, are configured as load-bearing seams. However, due to the interposition of the sleeve there are no welded joints between the cover and the nozzle. The inside of the sleeve with its stresses caused by the weld seam is no longer contacted by the medium located in the reactor pressure vessel, so that stress crack corrosion in this region is eliminated. By virtue of its circular construction, the annular seam between the sleeve and the nozzle has a more uniform stress distribution than the elliptical seam construction between the cover and the sleeve. By virtue of its remoteness from the inside of the cover, this annular seam is better accessible for an annealing operation, so that the occurrence of stress crack corrosion at the annular seam can be ruled out.

In accordance with another mode of the invention, there is provided a method in which the cover is milled away at the inside of the cover until a complete annular surface is formed on the inside of the cover, and a still remaining part of the nozzle enclosed by the cover is bored or drilled out to a diameter which is smaller than the outside diameter of the nozzle. The flattening of the cover facilitates the pulling out of the nozzle, since in this region there is no longer any frictional resistance.

In accordance with a further mode of the invention, there is provided a method in which a threaded sleeve that is provided with an internal thread and which is screwed onto an external thread of the nozzle is used as the sleeve, for the purpose of easier arresting of the sleeve before welding.

With the objects of the invention in view, there is also provided a method of exchanging a nozzle passing through a cover of a nuclear reactor pressure vessel for guiding a control rod, which comprises removing the nozzle being welded in a through-bore formed in the cover with the nozzle being fixed relative to the cover, by boring or drilling out and subsequently pulling out the nozzle; introducing a new nozzle with a prestressing relative to the cover; and fixing the new nozzle in a prestressed position.

Through the use of this method, both weld seams are freed from loading and can be configured as sealing seams. The prestressing in this case is chosen in such a way that both the axial forces and the horizontal forces are compensated for. If press-fit conditions prevail between the nozzle and the cover, in this way part of the horizontal forces is absorbed, so that the prestressing can be correspondingly reduced.

In accordance with another mode of the invention, there is provided a method which comprises milling the cover from the inside until a complete annular surface is formed; countersinking the through-bore from an upper surface of the cover to form a supporting surface; screwing an internal thread of a sleeve onto an external thread of the new nozzle inserted into the through-bore; applying the prestressing by pulling the new nozzle against the supporting surface; bringing the threaded sleeve against the annular surface; and forming weld seams between the sleeve and the cover and between the sleeve and the new nozzle.

In accordance with a further mode of the invention, there is provided a method in which the supporting surface runs perpendicularly to the axis of the nozzle or else a conical surface is widened in the direction of the upper surface of the cover.

In accordance with an added mode of the invention, there is provided a method in which a stressing or tensioning tube disposed between the cover and the nozzle is used in order to achieve a prestressing. However, the strain path of the tube in the elastic range must be at least as great as the strain path of the region of the cover clamped between the annular surface and the supporting surface of the cover, taking into account possible differences in thermal expansion. In accordance with an additional mode of the invention, there is provided a method which comprises forming the nozzle and the stressing tube from the same material or from different material. If different materials are used for the nozzle and for the stressing tube which acts virtually as a resilient intermediate piece, influencing of the prestressing is possible due to the different coefficients of expansion under increasing temperatures.

The steps concerning the installation of the nozzle can also be used in the production of a cover for a nuclear reactor pressure vessel.

Other features which are considered as characteristic for the invention are set forth in the appended claims.

Although the invention is illustrated and described herein as embodied in a method of exchanging a nozzle passing through a cover of a nuclear reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a view similar to FIG. 2 showing another step used in carrying out the exchange, and FIG. 3a is a further enlarged view of a portion of FIG. 3;

FIGS. 4 and 4a are views similar to FIGS. 3 and 3a showing another step used in carrying out the exchange;

FIG. 5 is a view similar to FIG. 2 showing a further step used for carrying out the exchange;

FIGS. 6 and 6a are views similar to FIGS. 3 and 3a showing yet another step used in carrying out the exchange;

FIGS. 7 and 7a are views similar to FIGS. 3 and 3a showing still a further step for carrying out the exchange;

DESCRIPTION OF THE PREFERRED EMBODIMENTS

Figure 1:
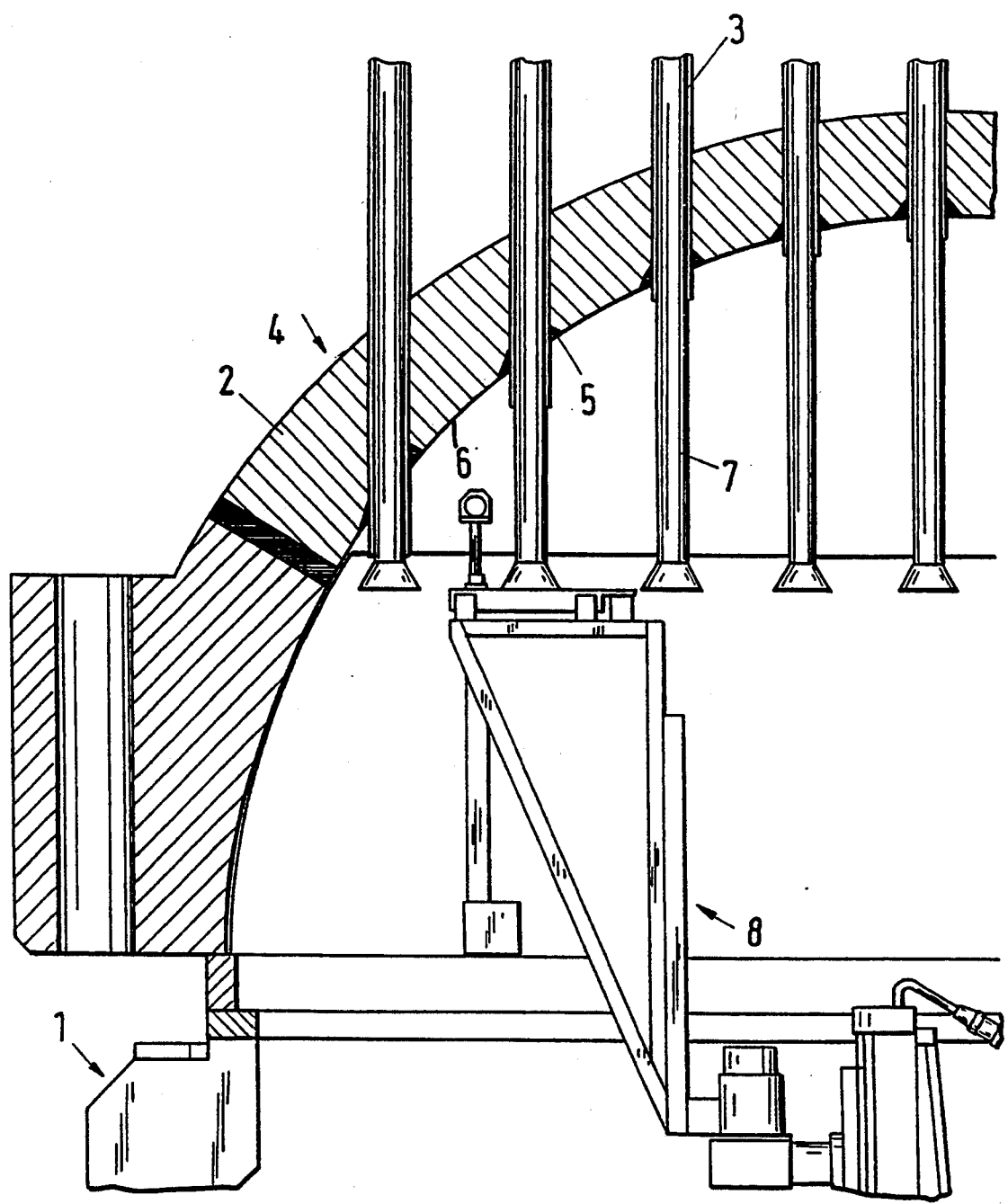
FIG. 1 is a fragmentary, diagrammatic, cross-sectional view of a reactor pressure vessel cover with nozzles.

Referring now to the figures of the drawing in detail and first, particularly, to FIG. 1 thereof, there is seen a reactor pressure vessel cover 2 that is set down on an annular load-bearing framework 1. The dome-shaped cover 2 is provided with a multiplicity of nozzles or connection pieces 3, each of which enter into a press-fit connection with a respective through-bore 4 and are connected by means of a weld seam 5 to an inner surface 6 of the cover. A heat-insulating sleeve 7 passes through each nozzle, while maintaining a gap. When the cover 2 is put to its intended use, a non-illustrated control rod is guided through the heat-insulating sleeve. A device 8 for exchanging nozzles suffering from defects is disposed within a space bounded by the cover 2 and the load-bearing framework 1.

Figure 2:
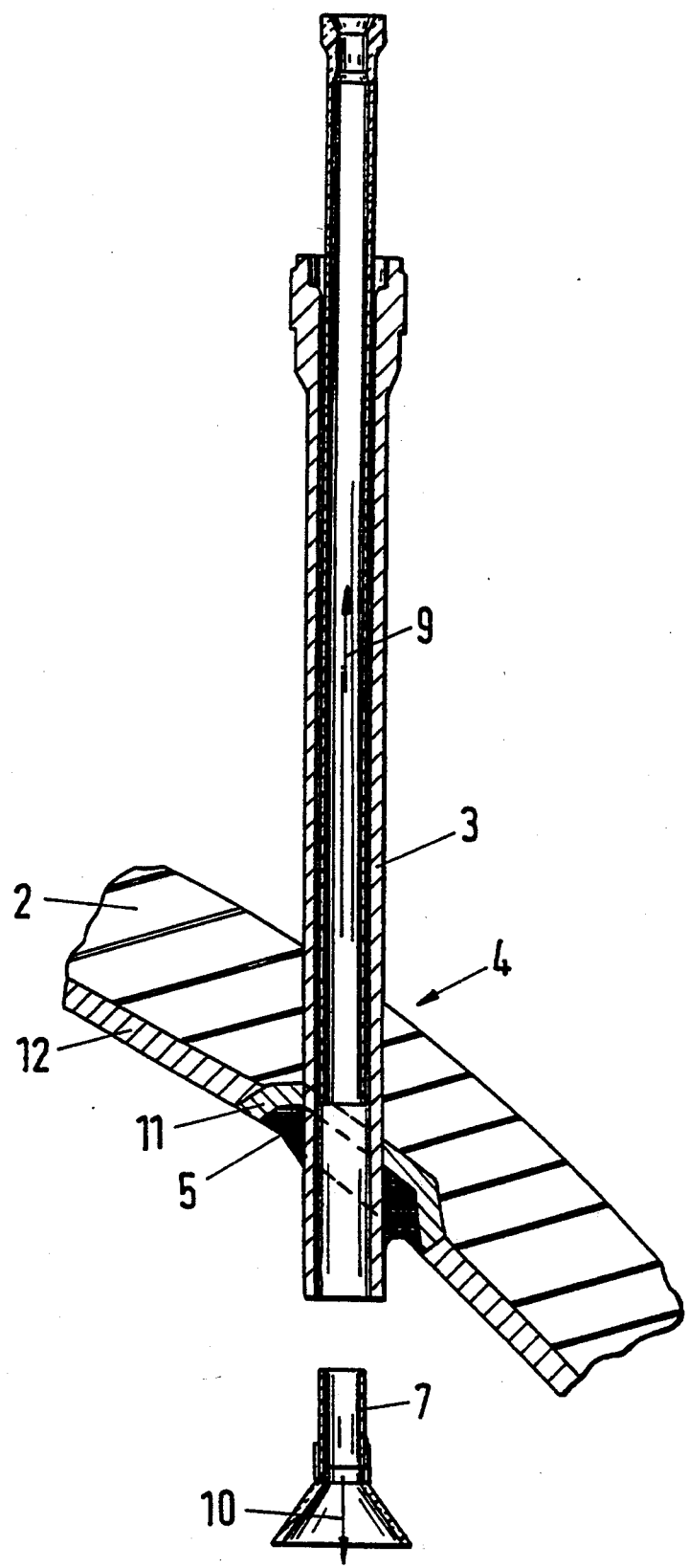
FIG. 2 is an enlarged, fragmentary, cross-sectional view of an individual nozzle showing a step used in carrying out the exchange.

FIGS. 2 to 6 use a portion of FIG. 1 to shown an exchange of a nozzle 3 by the method according to the invention. As is seen in FIG. 2, the nozzle 3 is welded to the cover 2 in the region of a low-stress buffering or cushioning 11, which is adjoined by a plating 12. Once the heat-insulating sleeve 7 has been severed, the heat-insulating sleeve which is then in two parts is removed from the nozzle 3 in the direction of arrows 9 and 10.

As is seen in FIGS. 3 and 3a, the nozzle 3 is milled away until a closed annular surface 13 has been formed in the lower or inner surface 6 of the cover 2. This is accomplished through the use of a non-illustrated surface-milling cutter having an outside diameter which is larger than the outside diameter of the nozzle 3. The closed annular surface 13 has an outside diameter which is a predeterminable amount larger than the diameter of the nozzle 3.

As can be seen from FIGS. 4 and 4a, the part of the nozzle 3 still remaining in the cover 2 is then drilled out, leaving a thin wall thickness of about 1 mm. Through the use of a non-illustrated apparatus, the nozzle 3 is pulled, so that the through-bore 4 remains unchanged in its original shape, apart from being milled free up to the annular surface 13.

FIG. 5 shows a section of the cover 2 following removal of the nozzle, from which it can be seen that the original weld seam 5 is essentially retained.

FIGS. 6 and 6a reveal a first step for installing the nozzle 3, which is introduced as a press-fit connection into the through-bore 4. In the region milled out up to the annular surface 13 there remains an annular space 14. According to FIGS. 7 and 7a, a threaded sleeve 15 which is provided with an internal thread is screwed into the annular space 14 by means of a corresponding external thread of the nozzle 3 until it comes to bear against the annular surface 13. In this position, a sealing weld seam 5a is placed between the cover and the nozzle 3 in the region of the original weld seam 5. Any introduction of heat or stress, which can only be small in any case by virtue of the small extent of the weld seam 5a, is kept away from the nozzle 3 by the threaded sleeve 15. In order to eliminate play which is inherent in the threaded connection in the axial direction, an annular seam 16, which may have caulking or welding, is placed between the threaded sleeve 15 and the nozzle 3.

Instead of the threaded sleeve 15 which is shown, a threadless sleeve may also be used in conjunction with a threadless nozzle. The sleeve is then pushed over the nozzle until it bears against the annular surface 13 and is welded with the original weld seam 5. Subsequently, the annular seam is set between the nozzle and the threadless sleeve.

Welding stresses are kept away from the nozzle by the sleeve or threaded sleeve. The annular seam between the sleeve or the threaded sleeve and the nozzle has a symmetrical stress input and is easily accessible for stress-relieving annealing by virtue of its remoteness from the inside of the cover.

Figure 8:
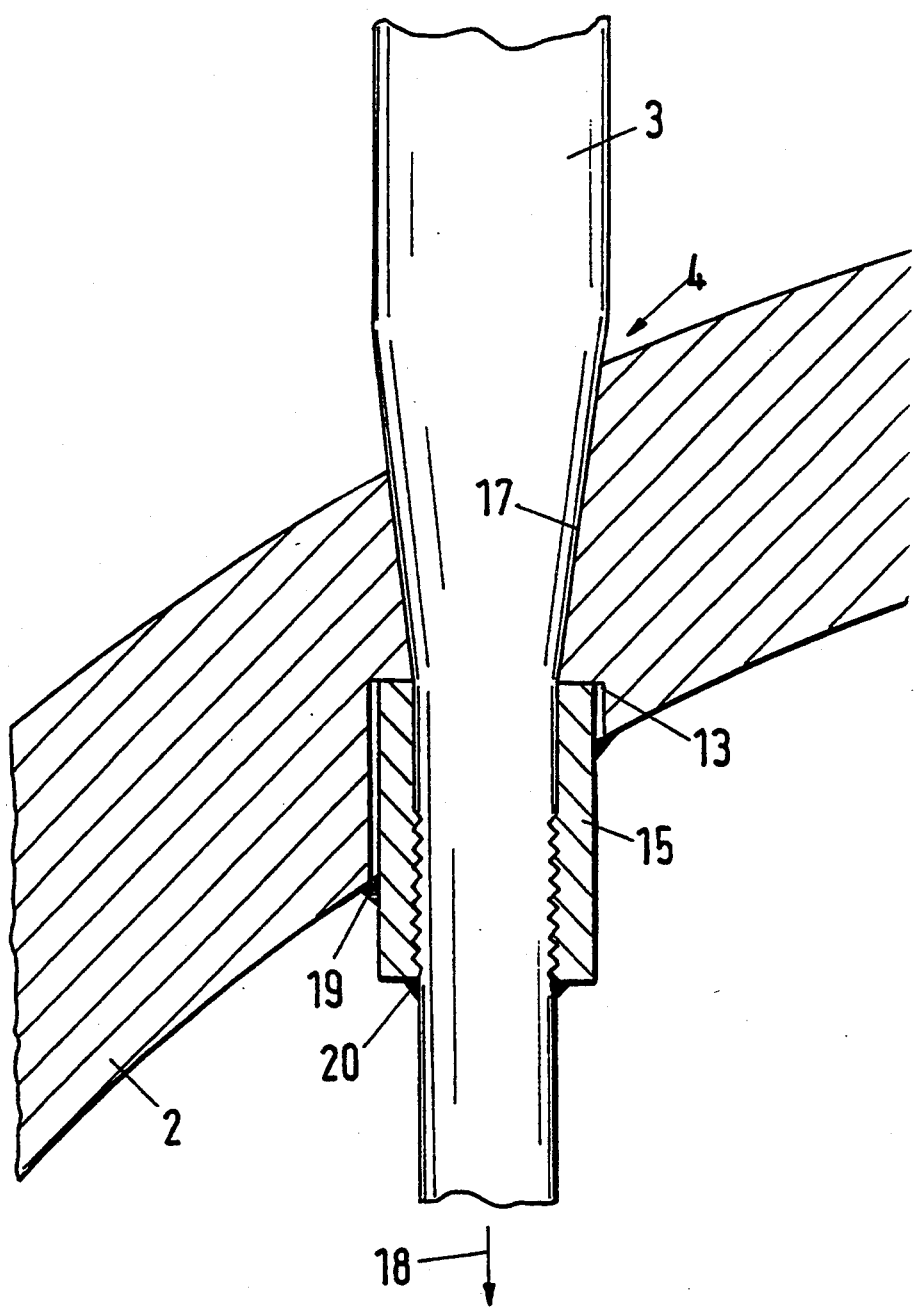
FIG. 8 is a further enlarged fragmentary, cross-sectional view of a nozzle inserted with prestressing.

Through the use of another method according to the invention, which is explained below with the aid of FIGS. 8 and 9, the installation of the nozzle 3 is performed with pre-stressing. For this purpose, according to the exemplary embodiment shown in FIG. 8, the cover 2 receives a supporting surface 17 at the through-bore 4, which is constructed as a cone, which tapers in the direction toward the inner surface of the cover and which conforms to a conical construction of the nozzle. Once the nozzle 3 has been inserted, a conical contact has been established and the threaded sleeve 15 has been brought to bear against the annular surface 13, a non-illustrated drawing device acts on the nozzle end protruding into the interior of the cover 2 and introduces the desired prestressing by pulling in the direction of the arrow 18. The drawing device maintains the prestressing until the threaded sleeve 15 has been brought to bear against the annular surface 13. Then the drawing device is removed and weld seams 19 and 20 put in place. Since the prestressing is chosen in such a way that axial and horizontal forces acting on the nozzle are compensated for, the weld seams are free from loading and are configured merely as sealing seams.

In the case of a method described below with reference to FIG. 9, a supporting surface 17a, running perpendicularly to an axis 21 of the nozzle 3, is introduced from the upper surface of the cover 2. The nozzle 3 which is inserted into the through-bore 4 rests on the supporting surface 17a through the use of a shoulder 23 and the interposition of a stressing tube 24. Once the threaded sleeve 15 has assumed its position, with the required prestressing being applied in the direction of an arrow 24' in this case as well and, before discontinuing the pulling force, the threaded sleeve 15 is brought to bear against the annular surface 13. In this case too, the weld seams 19 and 20 to be applied thereafter merely have sealing functions. The occurrence of stress crack corrosion in the region of the weld seams can therefore be ruled out.

In order to achieve effective prestressing, the strain path of the stressing tube 24 in the elastic range must be at least as great as the strain path of the region of the cover disposed between annular surface 13 and the supporting surface 17a. The nozzle and the stressing tube are formed of the same material, so that once chosen, the prestressing value is retained even under heating. If the aim is for the prestressing value to change at certain temperatures, a stressing tube of a material having a different coefficient of thermal expansion may be used.

Figure 9:
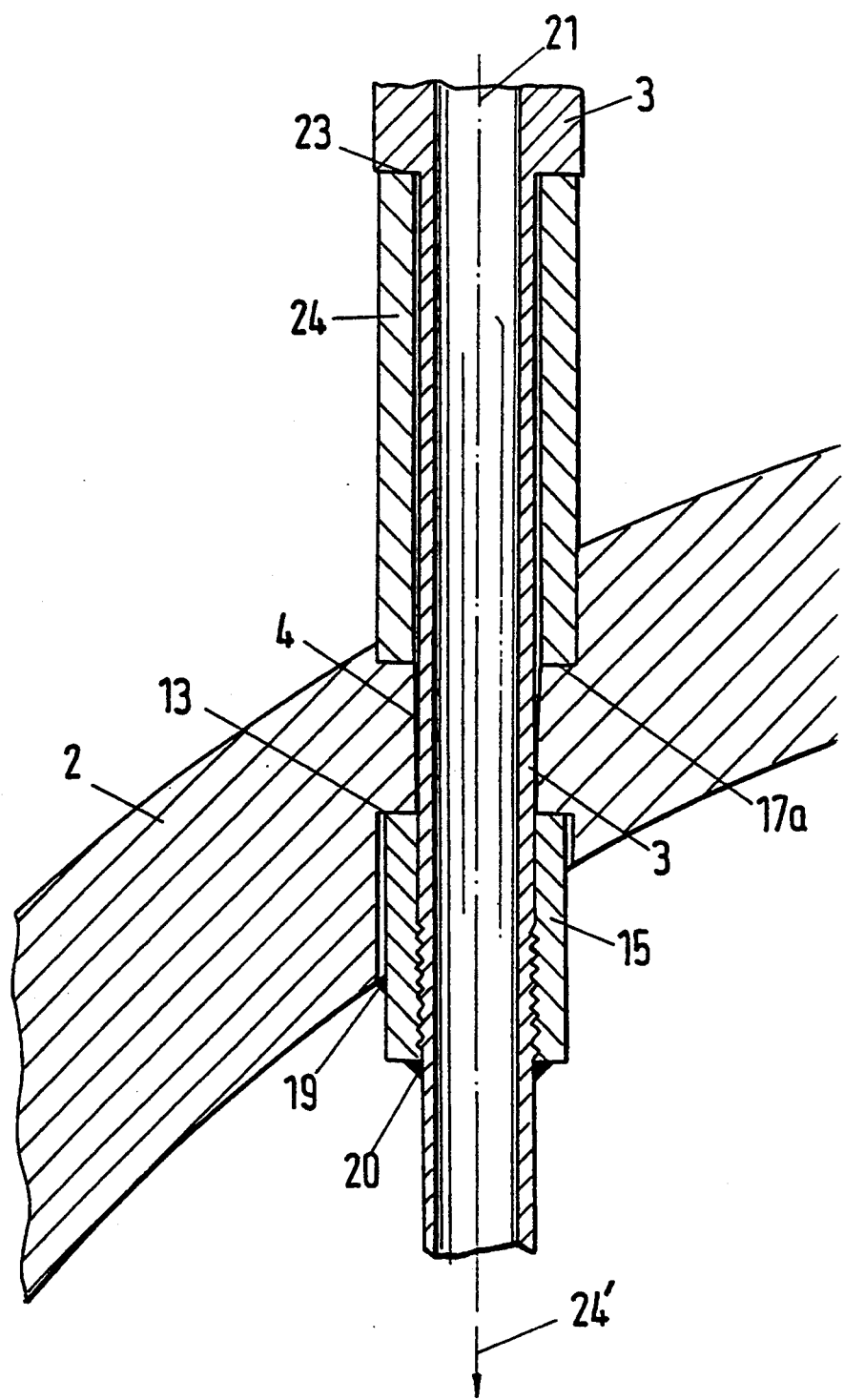
FIG. 9 is a view similar to FIG. 8 of another construction of a nozzle inserted with prestressing.

In the case of the exemplary embodiment according to FIG. 9, the region between the cover 2 at the through-bore 4 and the nozzle 3 may be configured optionally as a press-fit connection or by leaving a gap. The configuration as a press-fit is accomplished with a prestressing force of about 7 t, since the horizontal force to be expected is compensated for by the press-fit. If a gap is to be provided at the location, a prestressing force of significantly more than 7 t must be applied, since the horizontal forces have to be compensated for by the surface pressure of the supporting surface and the annular surface. The features concerning the installation of the nozzle can also be used in the production of new covers 2, in which case, of course, there is no preceding removal of a nozzle.

We claim:

1. A method of exchanging a nozzle passing through a cover of a nuclear reactor pressure vessel for guiding a control rod, wherein the nozzle is fixedly welded in a through-bore, the method which comprises: milling a nozzle away from an inside of a cover of a nuclear reactor pressure vessel until a complete annular surface is formed on an inner surface of the cover having an outer diameter greater than an outer diameter of the nozzle; boring out the remaining part of the nozzle to a diameter being smaller than an outer diameter of the nozzle;
    pulling out the nozzle;
    inserting a new nozzle into the through-bore;
    introducing a sleeve over the new nozzle until the sleeve comes to bear against the annular surface milled on the inside of the cover;
    producing a weld seam between the sleeve and the cover; and
    producing a weld seam between the sleeve and the new nozzle.

2. The method according to claim 1, which comprises screwing an internal thread of the sleeve onto an external thread of the new nozzle.

3. The method according to claim 1, which comprises press-fitting the nozzle to the cover at the through-bore.

4. A method of producing a cover for a nuclear reactor pressure vessel with a nozzle passing through the cover for guiding a control rod, which comprises:
    forming a through-bore in a cover of nuclear reactor pressure vessel;
    milling away an inner surface of the cover until a complete annular surface is formed on an inside of the cover extending perpendicularly to an axis of a through-bore formed in the cover and having an outer diameter greater than an outer diameter of a nozzle to be inserted into the through-bore;
    inserting a nozzle into the through-bore for guiding a control rod;
    introducing a sleeve over the nozzle until the sleeve comes to bear against the annular surface of the cover;
    producing a weld seam between the sleeve and the cover; and
    producing a weld seam between the sleeve and the nozzle.

5. A method of exchanging a nozzle passing through a cover of a nuclear reactor pressure vessel for guiding a control rod, which comprises:
    removing a nozzle being fixedly welded in a through-bore formed in a cover of nuclear reactor pressure vessel for guiding a control rod, by boring out and subsequently pulling out the nozzle;
    introducing a new nozzle with a prestressing relative to the cover; and
    fixing the new nozzle in a prestressed position.

6. The method according to claim 5, which comprises:
    milling the cover from the inside until a complete annular surface is formed;
    countersinking the through-bore from an upper surface of the cover to form a supporting surface;
    screwing an internal thread of a sleeve onto an external thread of the new nozzle inserted into the through-bore;
    applying the prestressing by pulling the new nozzle against the supporting surface;
    bringing the threaded sleeve against the annular surface; and
    forming weld seams between the sleeve and the cover and between the sleeve and the new nozzle.

7. The method according to claim 6, which comprises forming the supporting surface perpendicularly to the axis of the new nozzle.

8. The method according to claim 7, which comprises forming the supporting surface as a conical surface diverging in the direction toward the upper surface of the cover.

9. The method according to claim 6, which comprises inserting a stressing tube between a shoulder of the new nozzle and the supporting surface formed on the cover, the stressing tube having a strain path being at least as great as a strain path of a region of the cover between the annular surface and the supporting surface.

10. The method according to claim 9, which comprises forming the nozzle and the stressing tube from the same material.

11. The method according to claim 9, which comprises forming the nozzle and the stressing tube from different material.

12. A method of producing a cover for a nuclear reactor pressure vessel with a nozzle passing through the cover for guiding a control rod, which comprises:
   forming a through-bore in a cover of nuclear reactor pressure vessel;
   milling away an inner surface of the cover until a complete annular surface is formed on an inside of the cover extending perpendicularly to an axis of a through-bore formed in the cover and having an outer diameter greater than an outer diameter of a nozzle to be inserted into the through-bore;
   introducing from an upper surface of the cover a supporting surface extending perpendicularly to the axis of the through-bore;
   inserting a nozzle into the through-bore for guiding a control rod, such that the nozzle comes to bear against the supporting surface;
   screwing an internal thread of a sleeve onto an external thread of the new nozzle inserted into the through-bore;
   applying a prestressing by pulling the new nozzle against the supporting surface;
   bringing the threaded sleeve against the annular surface; and
   forming weld seams between the sleeve and the cover and between the sleeve and the new nozzle.

13. A method of exchanging a nozzle fixedly welded in a through-bore of and passing through a cover of a nuclear reactor pressure vessel for guiding a control rod, which comprises:
   milling a nozzle away from an inside of a cover of a nuclear reactor pressure vessel until a complete annular surface is formed on the inner surface of the cover, the surface having an outside diameter greater than an outside diameter of the nozzle;
   boring out a remaining part of the nozzle to a diameter smaller than the outside diameter of the nozzle;
   pulling out the nozzle;
   countersinking the through-bore from an upper surface of the cover to form a supporting surface;
   inserting a new nozzle into the through-bore;
   screwing an internal thread of a sleeve onto an external thread of the new nozzle inserted into the through-bore;
   applying a prestressing by pulling the new nozzle against the supporting surface;
   bringing the threaded sleeve against the annular surface; and
   forming weld seams between the sleeve and the cover and between the sleeve and the new nozzle.

14. The method according to claim 13, which comprises forming the supporting surface perpendicularly to the axis of the new nozzle.

15. The method according to claim 14, which comprises forming the supporting surface as a conical surface diverging in the direction toward the upper surface of the cover.

16. The method according to claim 13, which comprises inserting a stressing tube between a shoulder of the new nozzle and the supporting surface formed on the cover, the stressing tube having a strain path being at least as great as a strain path of a region of the cover between the annular surface and the supporting surface.

17. The method according to claim 16, which comprises forming the nozzle and the stressing tube from the same material.

18. The method according to claim 16, which comprises forming the nozzle and the stressing tube from different material.

* * * * *